United States Patent [19]

Watanabe

[11] Patent Number: 5,353,057
[45] Date of Patent: Oct. 4, 1994

[54] METHOD OF DRIVING INTERLINE TRANSFER TYPE CCD IMAGER

[75] Inventor: Takashi Watanabe, Kyoto, Japan

[73] Assignee: Sharp Kabushiki Kaisha, Abeno, Japan

[21] Appl. No.: 163,600

[22] Filed: Dec. 7, 1993

Related U.S. Application Data

[63] Continuation of Ser. No. 858,894, Mar. 27, 1992, abandoned.

[30] Foreign Application Priority Data

Mar. 29, 1991 [JP] Japan .................................. 3-067110

[51] Int. Cl.$^5$ .............................................. H04N 5/335
[52] U.S. Cl. ...................................... 348/322; 348/305
[58] Field of Search ............... 348/311, 316, 317, 319, 348/320, 321, 322, 302, 305, 294; H04N 5/335

[56] References Cited

U.S. PATENT DOCUMENTS

| | | | |
|---|---|---|---|
| 4,551,758 | 11/1985 | Masunaga et al. | 358/213.19 |
| 4,638,362 | 1/1987 | Oshima et al. | 358/213.22 |
| 4,686,573 | 8/1987 | Murayama et al. | 358/213.22 |
| 4,774,586 | 9/1988 | Koike et al. | 358/213.29 |
| 4,831,453 | 5/1989 | Takemura | 358/213.19 |

FOREIGN PATENT DOCUMENTS 62-40910  8/1987  Japan .......................... H04N 5/335

OTHER PUBLICATIONS

Design Consideration of p-Well Structure for Solid-State Image Sensors. IEEE Transaction on Electron Devices, vol. ED-32, No. 8, Aug. 1985.

Hoagland, Kenneth A., Television Applications Of Interline Transfer CCD Arrays, Proceedings Conference on Charge-Coupled Device Technology and Applications, Nov. 30–Dec. 2, 1976.

Sone, Y. et al., Technical Report Of Television Engineering Society, vol. 6, No. 45, Mar. 1983.

*Primary Examiner*—Joseph Mancuso
*Assistant Examiner*—Tuan V. Ho
*Attorney, Agent, or Firm*—David G. Conlin; George W. Neuner

[57] ABSTRACT

A method for driving an interline transfer type CCD imager by reading out a signal charge accumulated in one of first and second light receiving pixels to corresponding one of first and second accumulation regions. Part of the signal charge is transferred to the other one of the first and second accumulation regions which is disposed adjacently to the one of the accumulated regions. Another signal charge accumulated in the other one of the first and second light receiving pixels is read out so as to add the other signal charge to the part of the signal charge. Thereafter, the remaining part of the signal charge is transferred to the adjacent other one of the first and second accumulation regions.

13 Claims, 5 Drawing Sheets

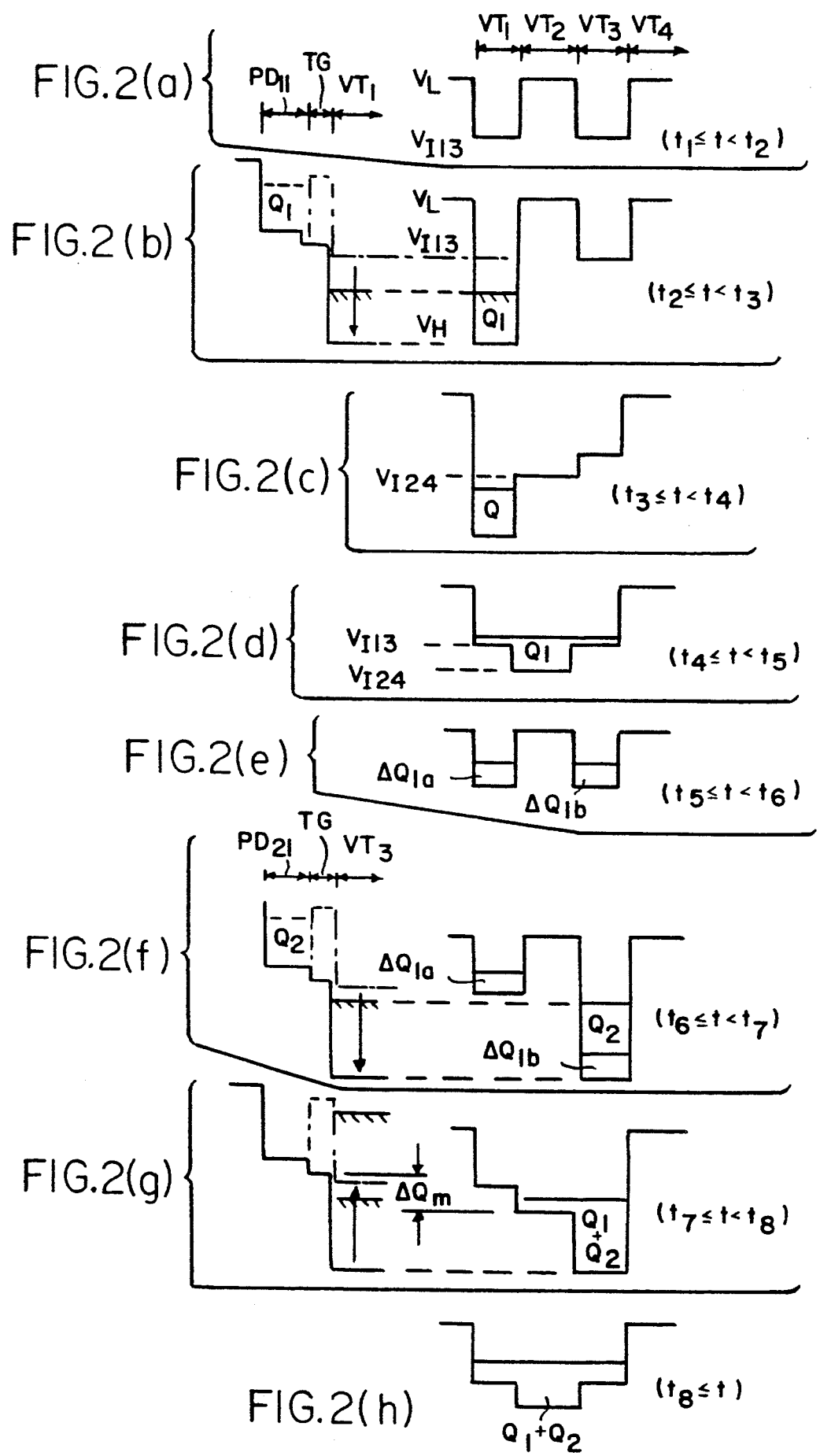

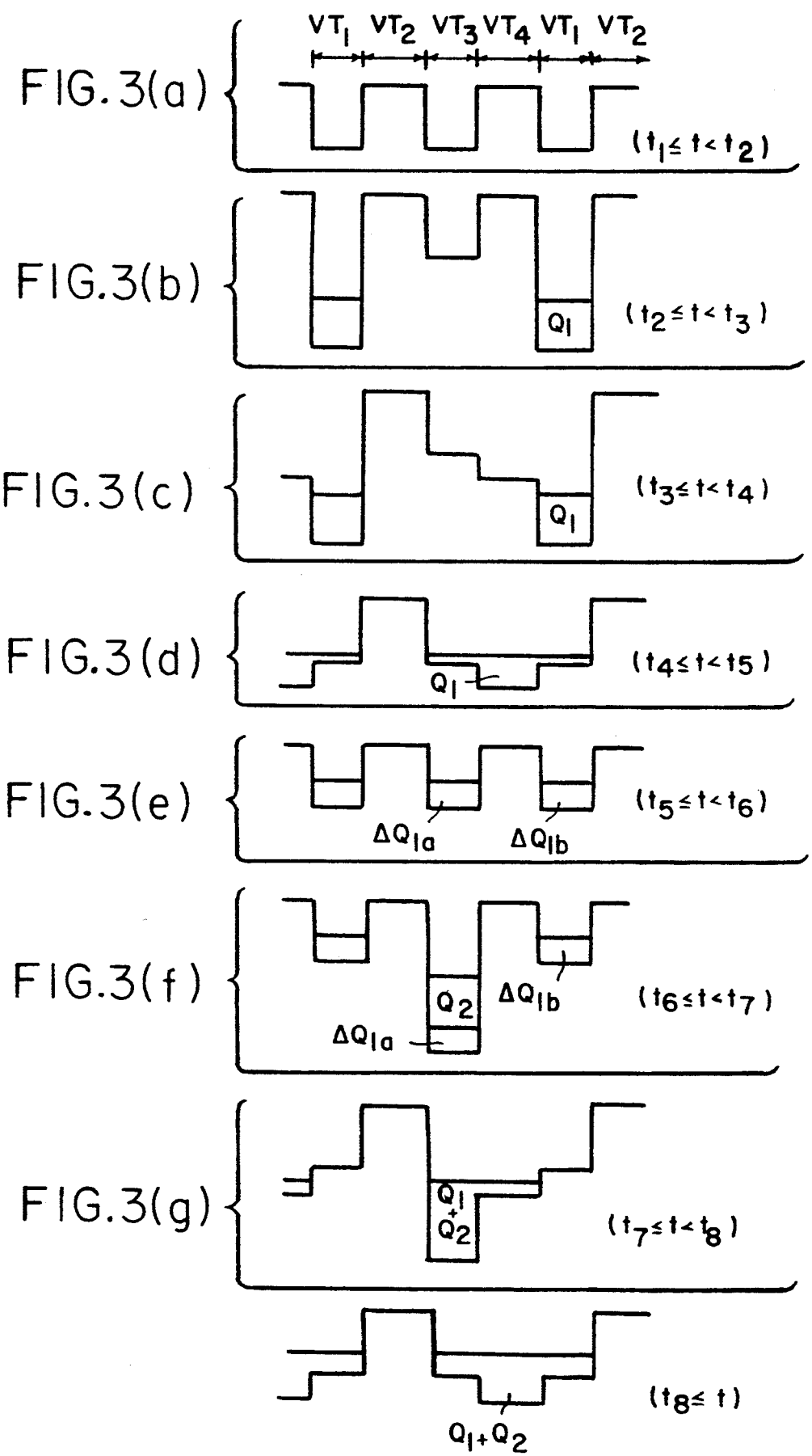

METHOD OF DRIVING INTERLINE TRANSFER TYPE CCD IMAGER

This is a continuation of copending application Ser. No. 07/858,894 filed on Mar. 27, 1992, now abandoned.

BACKGROUND OF THE INVENTION

1. Field of the Invention

The present invention relates generally to a method of driving an interline transfer type charge-coupled device (CCD) imager. More particularly, the present invention relates to a method of driving an interline transfer type CCD imager which operates in a field accumulation mode.

2. Description of the Prior Art

In an interline transfer type CCD imager, signals are generally read out by a 2/1-interlaced reading system in which two fields constitute one frame. The accumulation of signals in each of plural light receiving pixels is conducted in either a frame accumulation mode in which one light accumulation period for each pixel coincides with one frame; or a field accumulation mode in which one light accumulation period coincides with one field. The field accumulation mode has a high dynamic resolution, as is described in "Proc. of Conf. on Charge Coupled Device Tech. and Appl., p. 152 (1976)", and is commonly used in movie cameras.

Methods of driving a CCD imager in the field accumulation mode are generally classified as being a single transfer (ST) method or a double transfer (DT) method (See, lot example, Technical Report of Television Engineering Society of Japan, TEBS87-3 (1983)). In the ST method, the process of reading signals from the light receiving pixels into a vertical transfer unit is conducted in one step after the light accumulation period of one field. In contrast, in the DT method, the process of reading signals from the light receiving pixels is conducted in two steps.

In the ST method, as is graphically represented in FIGS. 5A and 5B, the respective signal charges $S_1$ and $S_2$ from all of the light receiving pixels PD are transferred to a vertical transfer unit V (FIG. 5A). Thereafter, the signal charges $S_1$ and $S_2$ of two vertically adjacent pixels are added in the vertical transfer unit V (FIG. 5B see also, for example, Japanese patent publication No. 62-40910). The addition in odd fields is conducted in a manner different from that in even fields, as is known, thereby complying with the interlaced reading system.

In the DT method, as is graphically represented in FIGS. 6A and 6B, the signal charges $S_1$ of half of the light receiving pixels are transferred initially to the vertical transfer unit V (FIG. 6A). Typically, this half of the light receiving pixels consists of every other pixel along the vertical direction as shown in FIG. 6A. Thereafter, the signal charges $S_1$ are transferred forward or backward in the vertical transfer unit V by a distance equal to one pixel pitch. The signal charges $S_2$ from the remaining light receiving pixels are subsequently read out and are added to the previously transferred signal charges $S_1$ (FIG. 6B). The transfer direction in odd fields along which signal charges $S_1$ are transferred by one pixel pitch is made different from that in even fields, thereby complying with the interlaced reading system.

One particular drawback associated with the above-described ST method is that signal charges of all of the light receiving pixels must first be retained in the vertical transfer unit V without mixing the signal charges. This often causes a decrease in the maximum transferable amount of signal charges. Problems can arise, for example, when a vertical transfer unit V is operated by a four-phase driving system. The signal charges transferred from one pixel must be held under one electrode in the vertical transfer unit V and, therefore, the signal charges are strongly affected by a fringe electric field as compared to another method in which the signal charges transferred from one pixel are held under two or more electrodes. Hence, the amount of signal charges transferred from each pixel in the ST method typically will be less than half of that in another method. As a result, even after signal charges transferred from two pixels are added according to the ST method, the amount of the resulting signal charges will not reach the amount of signal charges as compared to another method. As the difference in the available amounts of signal charges to be added in the ST method becomes greater, the degree of the reduction in signal charges as compared to other methods becomes even larger as will be appreciated.

Using the DT method, typically the maximum transferable amount of signal charges is not a problem, but signal charges in the vertical transfer unit V must be transferred in reverse directions depending on whether it is in relation to an odd or even field. Such reverse charge transfer of signal charges often causes a problem of erroneously transferring signal charges. Such problem does not exist in a forward charge transfer. For example, in a situation where there is a small potential dip in one portion of the vertical transfer unit V, forward charge transfers cause this potential dip to be filled always with a signal of the former stage, so as to prevent the potential dip from appearing externally. If, however, a reverse charge transfer is first conducted, the signal charge in the potential dip is swept away. This swept amount of signal charge from the potential dip is recovered by a signal of the next stage, resulting in an erroneous charge transfer which adversely affects the quality of output signals.

The assignee of this application has developed an imager which can eliminate the above-mentioned problems of the ST and DT methods (Japanese patent application No. 1-298973). In such an improved imager (represented in part by FIGS. 7A and 7B), the potential distribution in a vertical transfer unit V is controlled such that the signal charges of two vertically adjacent pixels will be added. Then, signal charges of all light receiving pixels are read out sequentially or simultaneously to be added. As a result, the above-described problems are eliminated, i.e., the problems of a reduced maximum transferable amount of signal charges, and of erroneous charge transfer caused by a reverse charge transfer. However, when signal charges of the light receiving pixels PD are read out, most of the electrodes of the vertical transfer unit V (in the four-phase driving system, for example, three electrodes) are set to a high potential. Hence, the potentials of light receiving pixels become unstable. Therefore, the improved imager has a drawback that, when reading out signal charges of light receiving pixels, the charge transfer may erroneously function.

An object of the present invention is to provide a method of driving an interline transfer type CCD imager by which the maximum transferable amount of signal charges in the field accumulation mode can be increased, and the above-described problems of an erroneous charge transfer due to a reverse charge transfer or the reading of signal charges from light receiving pixels can be eliminated.

SUMMARY OF THE INVENTION

The present invention provides a method of driving an interline transfer type CCD imager which overcomes the above-discussed and numerous other disadvantages and deficiencies of the prior art. According to the present invention, the maximum transferable amount of signal charges in the field accumulation mode can be increased. Furthermore, it is possible to stabilize the potential of a light receiving pixel in the reading operation. Therefore, an erroneous charge transfer in a reverse charge transfer or when reading signal charges from the light receiving pixels can be eliminated.

According to one particular aspect of the invention, a method is provided for driving an interline transfer type CCD imager which includes a plurality of light receiving pixels arranged in a matrix form and a plurality of vertical transfer units respectively disposed between columns of the light receiving pixels, each of the columns of light receiving pixels having a plurality of first light receiving pixels and a plurality of second light receiving pixels, the first and second light receiving pixels being alternately arranged in each column of light receiving pixels, each of the columns of the vertical transfer units having a plurality of first accumulation regions respectively corresponding to the first light receiving pixels and a plurality of second accumulation regions respectively corresponding to the second light receiving pixels, the first and second accumulation regions being alternately arranged in each column of vertical transfer units; and wherein the method includes the steps of reading out a signal charge accumulated in one of the first and second light receiving pixels to corresponding one of the first and second accumulation regions; transferring part of the signal charge accumulated in the one of the first and second accumulation regions to the other one of the first and second accumulation regions which is disposed adjacently on a prescribed side of the one of the accumulation regions; reading out another signal charge accumulated in the other one of the first and second light receiving pixels to the corresponding other one of the first and second accumulation regions, so as to add the other signal charge to the part of the signal charge which is accumulated in the other accumulation region; and transferring a remaining part of the signal charge which is accumulated in the other accumulation region to the adjacent other one of the first and second accumulation regions, so as to add the remaining part of the signal charge to the added signal charge which is accumulated in the other accumulation regions.

According to another particular aspect of the invention, a method of transferring signal charges from a plurality of charged devices comprises the steps of: reading out one of said signal charges from a first of said charged devices to a first accumulation region; transferring part of said one of said signal charges from said first accumulation region to a second accumulation region; reading out another of said signal charges from a second of said charged devices to said second accumulation region so as to add said another of said signal charges to said part of said one of said siganl charges; and transferring a remaining part of said one of said signal charges which is accumulated in said first accumulation region to said second accumulation region so as to add said remaining part of said one of said signal charges to said added signal charges in said second accumulation region.

BRIEF DESCRIPTION OF THE DRAWINGS

This invention may be better understood and its numerous objects and advantages will become apparent to those skilled in the art by reference to the accompanying drawings as follows.

Figure 5A:
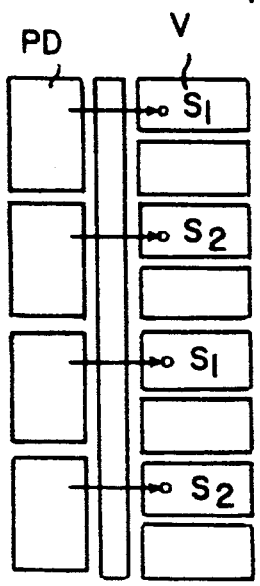
Figure 6A:
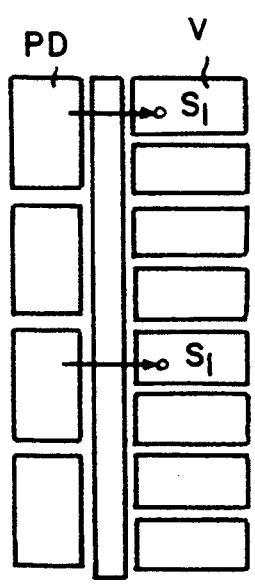
Figure 7A:
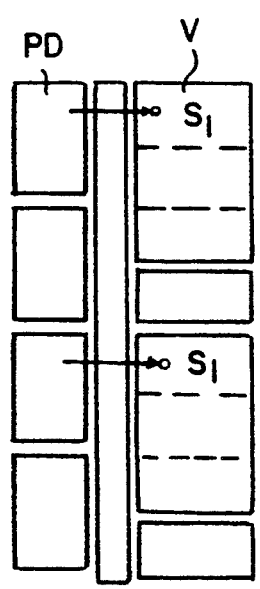
Figure 5B:
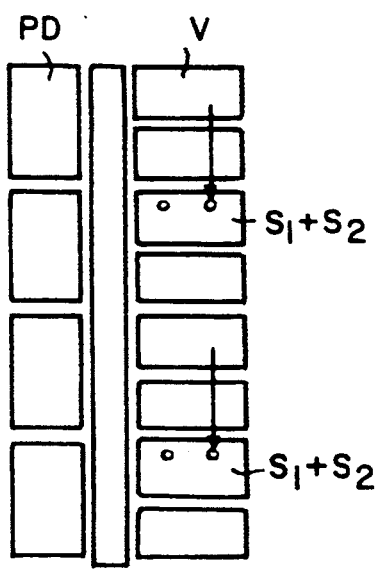
Figure 6B:
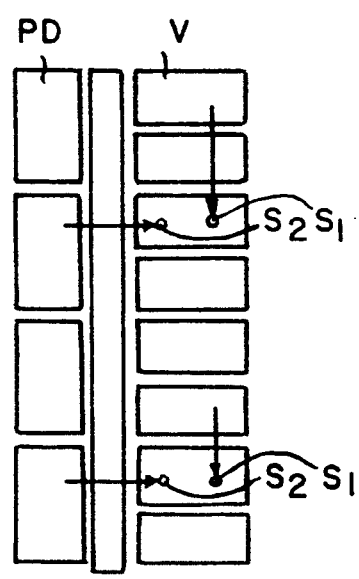
Figure 7B:
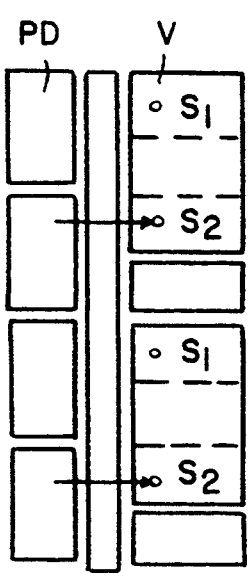

FIG. $2(a)$-$2(h)$ diagrammatically illustrate the time-dependent variations of the potential distributions for an odd field along a forward direction of a vertical transfer unit in accordance with the present invention;

FIG. $3(a)$-$3(h)$ diagrammatically illustrate the time-dipendent variations of the potential distributions for an even field along a forward direction of a vertical transfer unit in accordance with the present invention;

FIG. $4(a)$ and $4(b)$, respectively, are timing charts representing the driving pulses $\phi_{V1}$ to $\phi_{V4}$ in odd and even fields in accordance with the present invention;

FIGS. 5A and 5B illustrate a conventional single transfer method for driving a CCD imager in the field accumulation mode;

FIGS. 6A and 6B illustrate a conventional double transfer method for driving a CCD imager in the field accumulation mode; and FIGS. 7A and 7B illustrate schematically an improved imager.

DESCRIPTION OF THE PREFERRED EMBODIMENTS

The present invention will now be described with reference to the drawings wherein like reference labels are used to identify like elements throughout.

Figure 1:
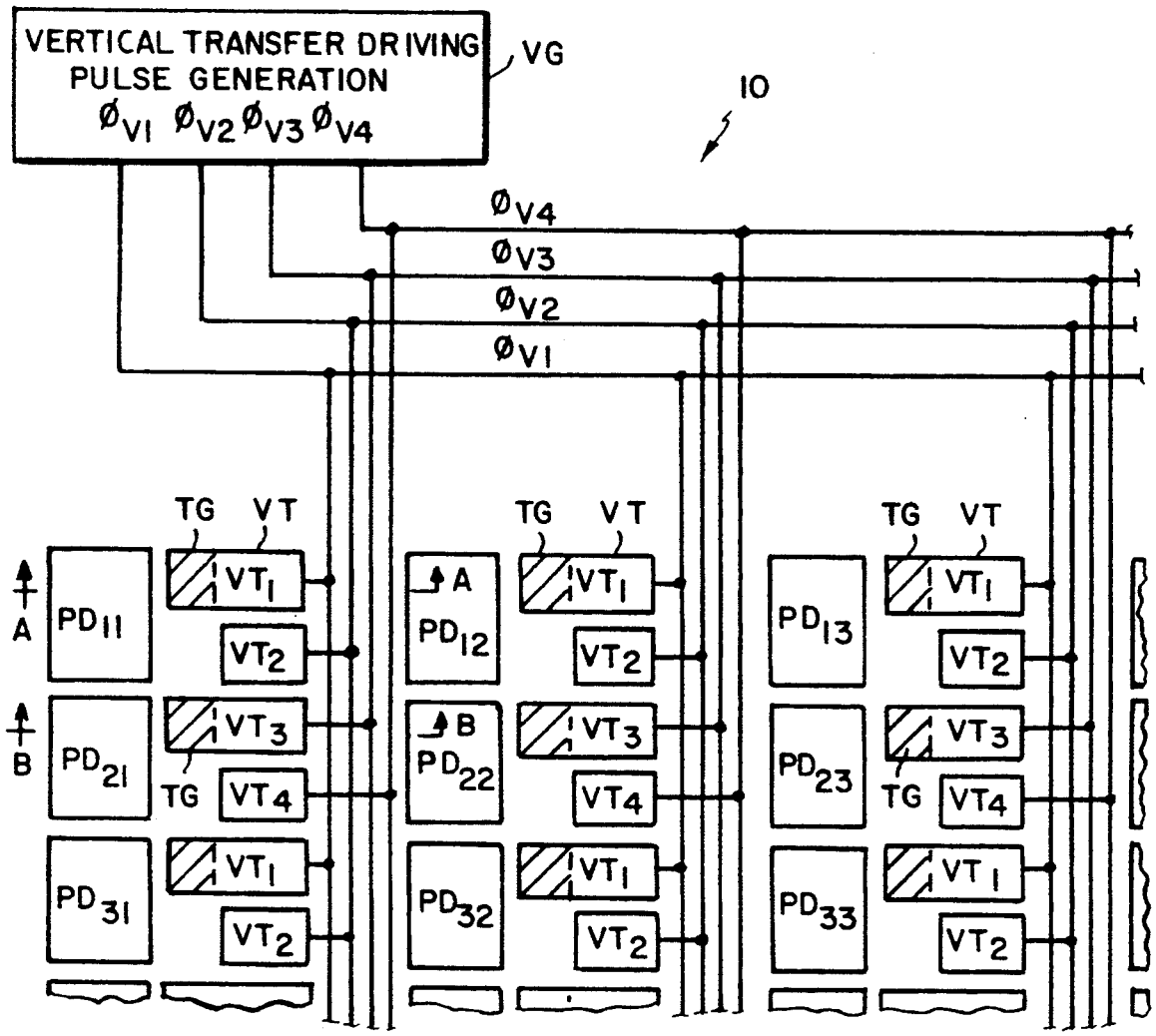
FIG. 1 is a block diagram of an interline transfer type CCD imager to be driven in accordance with the present invention.

FIG. 1 shows an exemplary interline transfer type CCD imager 10 which is driven by the method of the present invention. The interline transfer type CCD imager 10 includes photodiodes $PD_{ij}$ used as light receiving pixels which are arranged in a matrix form consisting of plural rows and columns. Between columns of the photodiodes $PD_{ij}$, corresponding columns of electrode groups are formed. More specifically, each of the columns of electrode groups constitutes a vertical transfer unit VT, and each of the electrode groups consists of four electrodes $VT_1$, $VT_2$, $VT_3$ and $VT_4$ as is illustrated. The lower end of each of the electrode group columns shown in FIG. 1 is connected to a horizontal transfer unit (not shown).

Four driving pulses $\phi_{V1}$, $\phi_{V2}$, $\phi_{\phi V3}$ and $\phi_{V4}$ are respectively applied to the four electrodes $VT_1$, $VT_2$, $VT_3$ and $VT_4$ of each electrode group, so that the imager 10 is driven in a four-phase driving system. The driving pulses $\phi_{V1}$-$\phi_{V4}$ are generated by a vertical transfer driving pulse generation circuit VG. A signal charge accumulated in each of the photodiodes $PD_{ij}$ is read out to a transfer region TG of the vertical transfer unit VT, such transfer region TG being common to either the electrodes $VT_1$ and $VT_3$. Namely, signal charges of odd-numbered photodiodes $PD_{ij}$ (e.g., i is odd) of each column are read out through a transfer region TG which extends from the corresponding electrodes $VT_1$. Signal charges of even-numbered photodiodes $PD_{ij}$ (e.g., i is even) in each column are read out through another transfer region TG which extends from the corresponding electrodes $VT_3$. Therefore, the regions of the electrodes $VT_1$ and $VT_2$ as referred to herein correspond to a first accumulation region, and the regions of the electrodes $VT_3$ and $VT_4$ correspond to a second accumulation region. In FIG. 1, the transfer regions TG are drawn hatched.

Figures 4A, 4B:
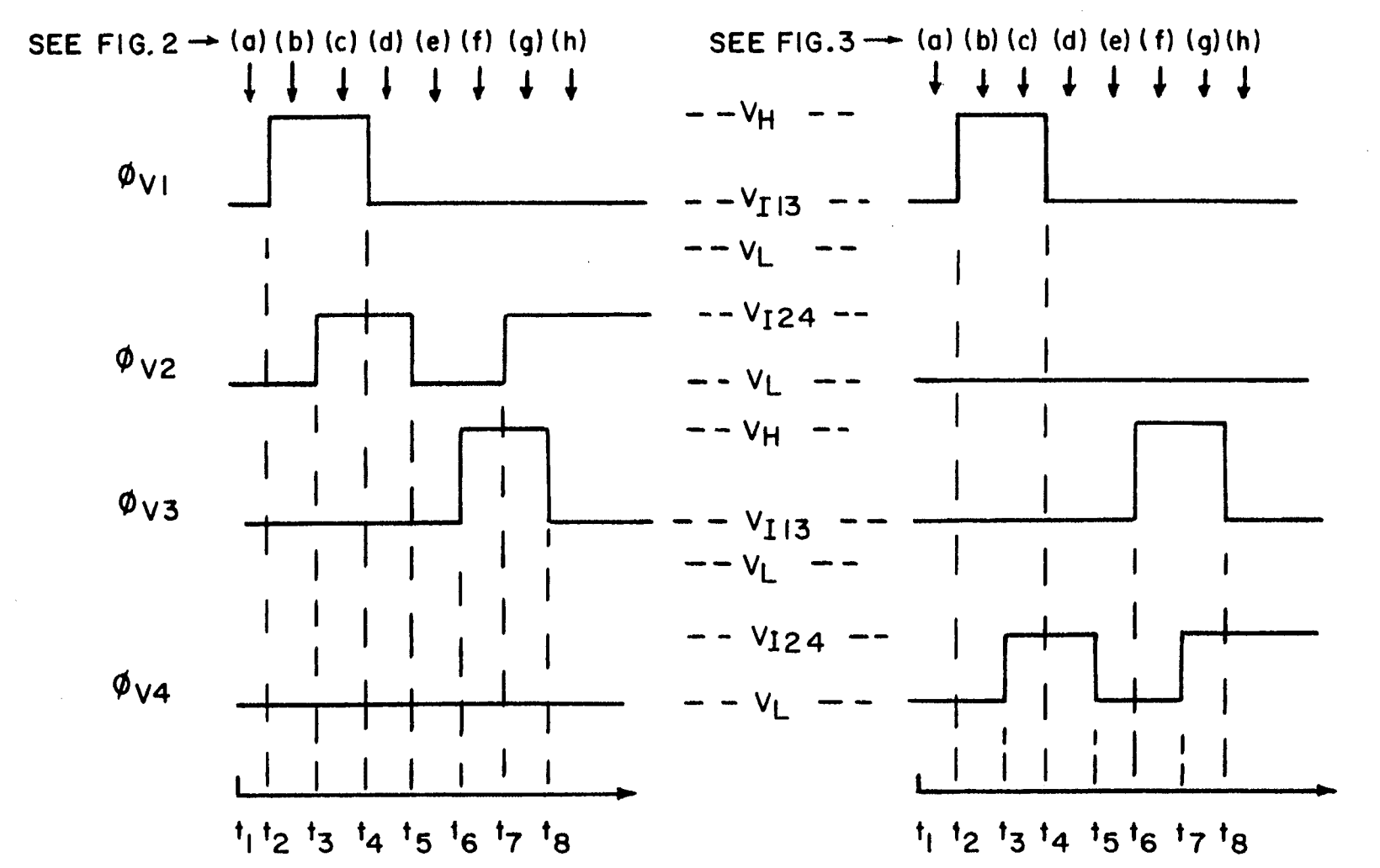

The manner of driving the imager 10 will be described with reference to FIGS. 2(a) to 4(b). FIGS. 2(a)–2(h) and 3(a)–3(h), respectively, show the time-dependent variations of the potential distributions along the forward direction of the vertical transfer unit VT (i.e., from the electrode $VT_1$ to the electrode $VT_4$) in odd and even fields. FIGS. 2(b'), 2(f') and 2(g') show the related time-dependent potential distributions along horizontal lines A—A and B—B (FIG. 1) which extend along the photodiode $PD_{ij}$, the transfer region TG, and the vertical transfer unit VT. FIG. 4(a) and 4(b) are timing charts representing the driving pulses $\phi_{V1}$ to $\phi_{V4}$ in odd and even fields, respectively. In the exemplary embodiment described with respect to the Figures, the signal charges are electrons.

In an odd field, at time $t_1$ as is shown in FIG. 4(a), the second and fourth driving pulses $\phi_{V2}$ and $\phi_{V4}$, which are respectively supplied to the electrodes $VT_2$ and $VT_4$ in each vertical transfer unit VT, are set to a low level $V_L$. The first and third driving pulses $\phi_{V1}$ and $\phi_{V3}$, which are respectively supplied to the electrodes $VT_1$ and $VT_3$ in each vertical transfer unit VT, are set to a first intermediate level $V_{I13}$, resulting in the potential distribution shown in FIG. 2(a). At time $t_2$, the first driving pulse $\phi_{V1}$ is set to a high level $V_H$ (FIG. 4(a)). As a result, the potential of the region under the electrode $VT_1$ is made deeper so that a signal charge $Q_1$ accumulated in the photodiode $PD_{ij}$ of an odd-numbered line (i.e., where i is an odd number) is transferred through the transfer region TG to the region under the electrode $VT_1$, as is illustrated in FIG. 2(b) and 2(b'). Hereinafter, the regions under the electrodes $VT_1$ to $VT_4$ are referred to simply as "the regions $VT_1$ to $VT_4$", respectively. With such charge transfer, since the potentials of the regions $VT_4$ and $VT_2$ adjacent to the region $VT_1$ into which the signal charge $Q_1$ is transferred are maintained at the low level $V_L$, the potential of the photodiode $PD_{ij}$ will be stable.

Then, while maintaining the first driving pulse $\phi_{V1}$ at the high level $V_H$, the second driving pulse $\phi_{V2}$ is raised at time $t_3$ from the low level $V_L$ to a second intermediate level $V_{I24}$ (where $V_{I24} \geq V_{I13}$) as is shown in FIG. 2(c). In addition, the first driving pulse $\phi_{V1}$ is lowered at time $t_4$ from the high level $V_H$ to the first intermediate level $V_{I13}$ as is represented in FIG. 2 (d). Preferably, the second intermediate level $V_{I24}$ is higher by several volts than the first intermediate level $V_{I13}$. At time $t_5$, the second driving pulse $\phi_{V2}$ is lowered from the second intermediate level $V_{I24}$ to the low level $V_L$ as is shown in FIG. 2 (e). As a result, a divisional signal charge $\Delta Q_{1a}$ of the signal charge $Q_1$ is transferred to the region $VT_1$, and the remaining divisional signal charge $\Delta Q_{1b}$ is transferred to the region $VT_3$. The result is that the potential distribution becomes as shown in FIG. 2(e) where $\Delta Q_{1a} + \Delta Q_{1b} = Q_1$.

According to the above-described series of operations, when the signal charge $Q_1$, which has been read out into a deep potential region, is returned to a potential state for a normal transfer, the signal charge $Q_1$ is surely held by a plurality of electrode regions (i.e., regions $VT_1$ and $VT_3$ as shown in FIG. 2(e)). Even if an excess signal charge enters one region of the vertical transfer unit, therefore, the signal charge is prevented from overflowing into adjacent regions.

Thereafter, the third driving pulse $\phi_{V3}$ is raised from the first intermediate level $V_{I13}$ to the high level $V_H$ at time $t_6$. This causes the potential of the region $VT_3$ to become deeper as illustrated in FIG. 2(f) so that a signal charge $Q_2$ accumulated in the photodiode $PD_{ij}$ of an even-numbered line (i.e., in this case, where i is an even number) is transferred through the transfer region TG to the region $VT_3$, and is added to the divisional signal charge $\Delta Q_{1b}$ which exists in the region $VT_3$. Since the potentials of the regions $VT_2$ and $VT_4$ adjacent to the region $VT_3$ are maintained at the low level $V_L$, the potential of the photodiode $PD_{ij}$ is stable.

Then, while maintaining the third driving pulse $\phi_{V3}$ at the high level $V_H$, the second driving pulse $\phi_{V2}$ is raised at time $t_7$ from the low level $V_L$ to the second intermediate level $V_{I24}$ as is shown in FIG. 2(g). As a result, the divisional signal charge $\Delta Q_{1a}$ in the region $VT_1$ is transferred to the region $VT_3$ and is added to the total signal charge $\Delta Q_{1b} + Q_2$ which exists in the region $VT_3$ such that $\Delta Q_{1b} + Q_2 + \Delta Q_{1a} = Q_1 + Q_2$. Therefore, the signal charges in the region $VT_3$ amounts the total of the signal charges $Q_1$ and $Q_2$ (i.e., $Q_1 + Q_2$).

When this total signal charge $Q_1 + Q_2$ is large, a portion thereof is held in the region $VT_2$. The amount of the total signal charge $Q_1 + Q_2$ held in the region $VT_3$ (and the region $VT_2$) is restricted to the upper limit at which the signal charge read out from the photodiode $PD_{ij}$ is not caused to flow back to that photodiode. As shown in FIG. 2(g), the second intermediate level $V_{I24}$ is set to a slightly higher level, so that the potential of the region $VT_2$ is made deeper than that of the transfer region TG of the region $VT_3$ by a margin $\Delta \phi_m$. Since a large amount of signal charges are transferred to the region $VT_2$ before a portion of the total signal charge flows back to the photodiode, therefore, the upper limit of the total signal charge $Q_1 + Q_2$ is sufficiently large.

Finally, the third driving pulse $\phi_{V3}$ is lowered at time $t_8$ from the high level $V_H$ to the first intermediate level $V_{I13}$ as illustrated in FIG. 2(h), whereby the total signal charge $Q_1 + Q_2$ is distributed to the three regions $VT_1$, $VT_2$ and $VT_3$ and is held therein. Thereafter, the signal transfer is continued to be conducted in a usual manner.

In an even field, the imager 10 is driven in the same manner as in an odd field except that the function of the region $VT_2$ is replaced with that of the region $VT_4$, as is illustrated in FIGS. 3(a)–3(h) and 4(b).

The vertical transfer driving pulse generation circuit VG generates the driving pulses $\phi_{V1}$–$\phi_{V4}$ on the basis of a clock signal, a horizontal synchronizing signal and a vertical synchronizing signal. The vertical transfer driving pulse generation circuit VG can be easily configured by using usual logic circuits or the like, and therefore its detailed description is omitted.

The above embodiment in which the second intermediate level $V_{I24}$ is set to be higher than the first intermediate level $V_{I13}$ ($V_{I24} \geq V_{I13}$) can achieve another effect that the maximum transferable amount of signal charges in a normal transfer which is conducted after time $t_8$ can be increased. Furthermore, if the imager 10 is constructed so that the electrodes $VT_2$ and $VT_4$ are formed as lower electrodes and the electrodes $VT_1$ and $VT_3$ as upper electrodes, the effect that, when a signal charge of a photodiode $PD_{ij}$ is read out to a vertical transfer unit VT, the potential variation of this photodiode $P_{ij}$ is suppressed is more pronounced, with the result that the present invention becomes further effective.

The configuration of an imager 10 to which the present invention can be applicable is not restricted to that which is described above, but the present invention can also applicable to an interline transfer type CCD imager having another configuration. For example, the transfer region TG may be constructed in the form of an independent gate. The driving system of vertical transfer unit VT is not restricted to the four-phase driving system, and three or more electrodes may be formed per one pixel as will be appreciated.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method of driving an interline transfer type CCD imager which comprises a plurality of light receiving pixels arranged in a matrix form and a plurality of vertical transfer units respectively disposed between columns of the light receiving pixels, each of the columns of light receiving pixels having a plurality of first light receiving pixels and a plurality of second light receiving pixels, the first and second light receiving pixels being alternately arranged in each column of light receiving pixels, each of the columns of the vertical transfer units having a plurality of first accumulation regions respectively corresponding to the first light receiving pixels and a plurality of second accumulation regions respectively corresponding to the second light receiving pixels, the first and second accumulation regions being alternately arranged in each column of vertical transfer units, the method comprising the steps of:

reading out a signal charge accumulated in the first light receiving pixels to the corresponding first accumulation regions, transferring part of the signal charge accumulated in each of the first accumulation regions to the second accumulation region which is disposed adjacent on a prescribed side of the first accumulation region, reading out another signal charge accumulated in the second light receiving pixels to the corresponding second accumulation region, so as to add the another signal charge to the part of the signal charge which is accumulated in the corresponding accumulation region, and transferring the remaining part of the signal charge which is accumulated in each of the first accumulation regions to the adjacent second accumulation regions, so as to add the remaining part of the signal charge to the added signal charge which is accumulated in the second accumulation region.

2. The method of claim 1, wherein said signal charges consist of electrons.

3. The method of claim 1, further comprising the step of generating a plurality of driving pulses for effecting said reading steps and said transferring steps.

4. The method of claim 3, wherein said imager is driven according to a multi-phase driving system.

5. The method of claim 4, wherein said multi-phase driving system is a four-phase driving system.

6. The method of claim i, wherein said first accumulation regions each comprise first and second transfer regions and said second accumulation regions each comprise third and fourth transfer regions, and wherein:

said step of reading out a signal charge accumulated in said first light receiving pixels comprises driving a potential of each of said first transfer regions at a high level substantially above the potential of said corresponding first light receiving pixels while driving a potential of each of said second and fourth transfer regions adjacent said first vertical transfer regions at a low level below that of said first light receiving pixels;

said step of transferring part of the signal charge accumulated in said first accumulation regions comprises driving the potential of each of said second transfer regions at a first intermediate level between said low and high levels, and lowering the level at which the potential of said first transfer regions are driven to a second intermediate level between said low and high levels to effect a transfer of at least a part of said charge in each of said first transfer regions to said respectively second transfer regions, and then driving the potential of each of said second transfer regions at said low level while driving the potential of each of said first and third light receiving pixels at said second intermediate levels to effect a transfer of at least part of said charge transferred to said second transfer regions to said respective third transfer regions;

said step of reading out another signal accumulated in said second light receiving pixels comprises driving the potential of each of said third transfer regions at a high level substantially above the potential of said second light receiving pixels while driving the potential of each of said second and fourth vertical transfer units adjacent said third vertical transfer regions at said low level below that of said second light receiving pixels; and said step of transferring the remaining part comprises driving the potential of each of said second transfer regions at said first intermediate level and driving the potential of said third transfer region at said second intermediate level.

7. The method of claim 6, wherein said first intermediate level is greater than said second intermediate level.

8. The method of claim 1, said first accumulation regions each comprising first and second transfer regions and said second accumulation regions each comprising third and fourth transfer regions, and wherein:

said step of reading out a signal charge accumulated in the first light receiving pixels comprises driving a potential of each of said first transfer regions from an intermediate level to a high level substantially above the potential of said first light receiving pixel and then driving said potential of each of said first transfer regions back to said intermediate level;

said step of reading out another signal charge accumulated in the second light receiving pixels occurring subsequent to said step of reading out a signal charge accumulated in the first light receiving pixels and comprising driving a potential of each of said third transfer regions from said intermediate level to said high level substantially above the potential of said second light receiving pixels and then driving said potential of each of said third transfer regions back to said intermediate level; and said step of transferring part of said signal charge comprises driving a potential of said second transfer regions from a low level to a high level while said first transfer regions are driven at said high level in said step of reading out a single charge, and then driving said potential of said second transfer regions back to said low level following said potential of each of said first transfer regions being driven back to said intermediate level but before said potential of each of said third transfer regions is driven to said high level in said step of reading out another signal charge.

9. A method of transferring signal charges in an interline transfer type charge coupled device (CCD) image, said CCD imager comprising a pair of elements for receiving charge, a first accumulation region adjacent a first of said elements and a second accumulation region adjacent a second of said elements, said method comprising the steps of:

reading out a signal charge from said first of said elements to said first accumulation region;

transferring part of said signal charge from said first accumulation region to said second accumulation region;

reading out another signal charge from said second of said elements to said second accumulation region so as to add said another signal charge to said part of said signal charge; and transferring a remaining part of said signal charge which is accumulated in said first accumulation region to said second accumulation region so as to add said remaining part of said signal charge to said added signal charges in said second accumulation region.

10. The method of claim 9, wherein said elements comprise light receiving pixels.

11. The method of claim 9, further comprising the step of using a vertical transfer unit to effect said reading steps and said transferring steps.

12. The method of claim 11, further comprising the steps of generating a plurality of driving pulses for driving said vertical transfer unit.

13. A method of transferring signal charges in an interline transfer type charge coupled device (CCD) imager, said CCD imager comprising a plurality of first elements for receiving charge and a plurality of second elements for receiving charge arranged in alternating order in a column, and a vertical transfer unit including a plurality of electrode groups each including first to fourth transfer regions arranged in numbered order in a column adjacent said column of first and second elements, said first and second transfer regions of each electrode group being located adjacent a corresponding one of said first elements, and said third and fourth transfer regions of each electrode group being located adjacent a corresponding one of said second elements, said method comprising the steps of:

(a) driving a potential of each of said first transfer regions at a high level substantially above the potential of said corresponding first element while driving a potential of each of said second and fourth transfer regions adjacent said first vertical transfer regions at a low level below that of said first element to transfer a charge on said first element to said first transfer region;

(b) driving the potential of each of said second transfer regions at a first intermediate level between said low and high levels and lowering the level at which the potential of said first transfer regions are driven to a second intermediate level between said low and high levels to effect a transfer of at least a part of said charge in each of said first transfer regions to said respective second transfer regions;

(c) driving the potential of each of said second transfer regions at said low level while driving the potential of each of said first and third elements at said second intermediate levels to effect a transfer of at least part of said charge transferred to said second transfer regions to said respective third transfer regions, and then driving the potential of each of said third transfer regions at a high level substantially above the potential of said second element while driving the potential of each of said second and fourth vertical transfer units adjacent said third vertical transfer regions at said low level below that of said second element to transfer a charge on said second element to said third transfer region; and (d) driving the potential of each of said second transfer regions at said first intermediate level and driving the potential of said third transfer region at said second intermediate level to effect a combination of said charges from said first and second elements within said second and third transfer regions.

* * * * *

UNITED STATES PATENT AND TRADEMARK OFFICE
CERTIFICATE OF CORRECTION

PATENT NO. : 5,353,057
DATED : October 4, 1994
INVENTOR(S) : Takashi Watanabe

It is certified that error appears in the above-indentified patent and that said Letters Patent is hereby corrected as shown below:

In the Drawings (Sheet 2):

Fig. 2 (b), after "b", insert --'--;

Fig. 2 (f), after "f", insert --'--'

Fig. 2 (g), after "g", insert --'--.

Column 4, line 15, after "(a)" please insert --(b'), (c), (d), (e), (f') (g') and (h).

Column 7, line 54, after "corresponding", insert --second--.

Column 8, line 3, after "claim", delete "i" insert --1--.

Signed and Sealed this

Twenty-fifth Day of April, 1995

Attest:

BRUCE LEHMAN

Attesting Officer       Commissioner of Patents and Trademarks